US012714101B2

(12) United States Patent
Ding et al.

(10) Patent No.: US 12,714,101 B2
(45) Date of Patent: Aug. 25, 2026

(54) HUMIDITY-RESPONSIVE ANTIBACTERIAL MEMBRANE, AND PREPARATION METHOD AND USE THEREOF

(71) Applicant: Innovation Center of Yangtze River Delta, ZJU, Zhejiang (CN)

(72) Inventors: Tian Ding, Zhejiang (CN); Meimei Guo, Zhejiang (CN); Mofei Shen, Zhejiang (CN); Jinsong Feng, Zhejiang (CN); Xiuqin Chen, Zhejiang (CN)

(73) Assignee: INNOVATION CENTER OF YANGTZE RIVER DELTA, ZJU, Jiaxing City (CN)

( * ) Notice: Subject to any disclaimer, the term of this patent is extended or adjusted under 35 U.S.C. 154(b) by 407 days.

(21) Appl. No.: 18/436,250

(22) Filed: Feb. 8, 2024

(65) Prior Publication Data

US 2025/0185652 A1 Jun. 12, 2025

(30) Foreign Application Priority Data

Dec. 11, 2023 (CN) ........................ 202311697448.9

(51) Int. Cl.

*A01N 25/34* (2006.01)
*A01N 25/10* (2006.01)
*A01N 59/16* (2006.01)
*A01P 1/00* (2006.01)

(52) U.S. Cl.

CPC ............ *A01N 25/34* (2013.01); *A01N 25/10* (2013.01); *A01N 59/16* (2013.01); *A01P 1/00* (2021.08)

(58) Field of Classification Search

None

See application file for complete search history.

(56) References Cited

FOREIGN PATENT DOCUMENTS

WO WO2017/148439 * 9/2017

OTHER PUBLICATIONS

Toci et al. (entitled "Gold nanostars embedded in PDMS films", Nanomaterials, MDPI, 2021). (Year: 2021).*

Luo et al. (entitled "Co-delivery of superfine nano-silver and solubilized sulfadiazine for enhanced antibacterial functions", International Journal of Pharmaceutics, May 7, 2020, vol. 584) (Year: 2020).*

* cited by examiner

*Primary Examiner* — Yan Lan

(74) *Attorney, Agent, or Firm* — Cowan, Liebowitz & Latman, P.C.; Mark Montague

(57) ABSTRACT

Disclosed are a humidity-responsive antibacterial membrane, and a preparation method and use thereof, which belong to the field of functional membrane materials. The humidity-responsive antibacterial membrane includes a polydimethylsiloxane (PDMS) membrane and an ultrafine nanogold complex embedded in the PDMS membrane, wherein the ultrafine nanogold complex includes a cyclodextrin metal-organic framework (CD-MOF) and ultrafine gold nanoparticles loaded on the CD-MOF. The humidity-responsive antibacterial membrane is formed by a CD-MOF loaded with ultrafine gold nanoparticles, and PDMS, which has excellent humidity response performance and antibacterial properties, and meanwhile good mechanical properties.

15 Claims, 16 Drawing Sheets

HUMIDITY-RESPONSIVE ANTIBACTERIAL MEMBRANE, AND PREPARATION METHOD AND USE THEREOF

CROSS REFERENCE TO RELATED APPLICATION

This patent application claims the benefit and priority of Chinese Patent Application No. 2023116974489 filed with the China National Intellectual Property Administration on Dec. 11, 2023, the disclosure of which is incorporated by reference herein in its entirety as part of the present application.

TECHNICAL FIELD

The present disclosure relates to the field of functional membrane materials, and in particular, to a humidity-responsive antibacterial membrane, and a preparation method and use thereof.

BACKGROUND

Metal-organic frameworks (MOFs), as porous coordination materials composed of multidentate organic ligands and metal ions or metal clusters, have infinite network structure (s) formed via coordination bonds or covalent bonds between the metal ion center and the organic ligands. MOFs have advantages such as large specific surface area, adjustable functions and high porosity, and are fast-growing novel porous materials, and thus have a broad prospect of application.

Cyclodextrins are naturally occurring cyclic oligosaccharides that are produced in the action of cyclodextrin glycosyltransferase during the enzymatic degradation of starch. Cyclodextrins generally contain 6 to 12 D-glucopyranose units, among which molecules with 6, 7, and 8 D-glucopyranose units are of great practical significance, called α-, β-, and γ-cyclodextrins, respectively. Cyclodextrin has a three-dimensional hollow conical cyclic structure. Cyclodextrin has better hydrophilicity because of $C_2$ and $C_3$ secondary hydroxyl groups at upper end of its lateral structure.

Cyclodextrin metal-organic framework (CD-MOF) is a kind of novel metal-organic framework composed of cyclodextrin and alkali metal ions in a way of organic coordination. Compared with conventional MOFs, CD-MOF has good water solubility and nontoxicity, and features of multi-pores and large specific surface area, and the like. There is a spherical cavity having a diameter of about 1.7 nm in its cubic center, and it has a pore diameter of about 0.78 nm (taking a CD-MOF prepared by γ-cyclodextrin as an example). Due to its superior cavity structure, CD-MOF could be used as a delivery material. Further development of the use of CD-MOFs has become a hotspot of researches at present.

SUMMARY

An object of the present disclosure is to provide a humidity-responsive antibacterial membrane, and a preparation method and use thereof. In the present disclosure, the humidity-responsive antibacterial membrane is formed by a cyclodextrin metal-organic framework (MOF) loaded with ultrafine gold nanoparticles, and polydimethylsiloxane (PDMS). The humidity-responsive antibacterial membrane has excellent humidity response performance and antibacterial properties.

To achieve the above object of the present disclosure, the present disclosure provides the following technical solutions.

Provided is a humidity-responsive antibacterial membrane, including a PDMS membrane and an ultrafine nanogold complex embedded in the PDMS membrane, wherein the ultrafine nanogold complex includes a cyclodextrin MOF and ultrafine gold nanoparticles loaded on the cyclodextrin MOF.

In some embodiments, the humidity-responsive antibacterial membrane has a thickness of 0.45-0.90 mm.

In some embodiments, a mass content of the ultrafine nanogold complex in the humidity-responsive antibacterial membrane is not more than 3.65%.

In some embodiments, the ultrafine gold nanoparticles each have a particle size of 1-3 nm, and a loading rate of the ultrafine gold nanoparticles in the ultrafine nanogold complex is in a range of 0.18-2.33 wt %.

The present disclosure further provides a method for preparing the humidity-responsive antibacterial membrane according to the above technical solutions, including the following steps:

- providing raw materials for preparing the PDMS membrane, the raw materials including a silicone elastomer base prepolymer and a silicone elastomer base curing agent;
- mixing the silicone elastomer base prepolymer with the silicone elastomer base curing agent, and conducting forming membrane and precuring, to obtain a precured membrane; and
- applying the ultrafine nanogold complex onto a surface of the precured membrane, and conducting composite curing treatment, to obtain the humidity-responsive antibacterial membrane.

In some embodiments, the forming membrane and precuring includes:

- mixing the silicone elastomer base prepolymer and the silicone elastomer base curing agent with a first organic solvent, to obtain a mixed solution; and
- removing the first organic solvent in the mixed solution to form a prefab membrane, and precuring the prefab membrane to obtain the precured membrane.

In some embodiments, removing the first organic solvent in the mixed solution to form a prefab membrane is conducted under conditions comprising room temperature of 20-30° C., and a time of 3-6 h; and the precuring is conducted at a temperature of 70-80° C. for 10-20 min.

In some embodiments, the composite curing treatment includes:

- dispersing the ultrafine nanogold complex in a second organic solvent to obtain a dispersion liquid; and
- applying the dispersion liquid onto a surface of the precured membrane, removing the second organic solvent in the dispersion liquid, and then conducting curing, to obtain the humidity-responsive antibacterial membrane.

In some embodiments, the curing is conducted at a temperature of 65-85° C. for 3-5 h.

The present disclosure provides use of the above-described humidity-responsive antibacterial membrane or the humidity-responsive antibacterial membrane prepared by the above-described method in antibacterial packaging.

The present disclosure provides a humidity-responsive antibacterial membrane, including a PDMS membrane and an ultrafine nanogold complex embedded in the PDMS membrane, wherein the ultrafine nanogold complex includes a cyclodextrin metal-organic framework (CD-MOF) and ultrafine gold nanoparticles loaded on the CD-MOF. The ultrafine nanogold complex in the humidity-responsive antibacterial membrane according to the present disclosure is a cyclodextrin metal-organic framework loaded with ultrafine gold nanoparticles (Au@CD-MOF). In this present disclosure, CD-MOF is adopted as a template to limit the particle size of the ultrafine gold nanoparticles to achieve a good antibacterial ability. Hydrophobic PDMS serves as a matrix membrane and hydrophilic CD-MOF serves as a restrictive template. The hydrophobic PDMS matrix membrane in the obtained humidity-responsive antibacterial membrane could protect the hydrophilic CD-MOF's structure from being damaged at a lower humidity, i.e., the ultrafine gold nanoparticles are not released; while at a larger humidity, the ultrafine gold nanoparticles are released upon contacting with water. Therefore, the humidity-responsive antibacterial membrane of the present disclosure has good humidity response performance and antibacterial properties. Moreover, the humidity-responsive antibacterial membrane according to the present disclosure has good mechanical properties.

DETAILED DESCRIPTION OF THE EMBODIMENTS

Figure 1:
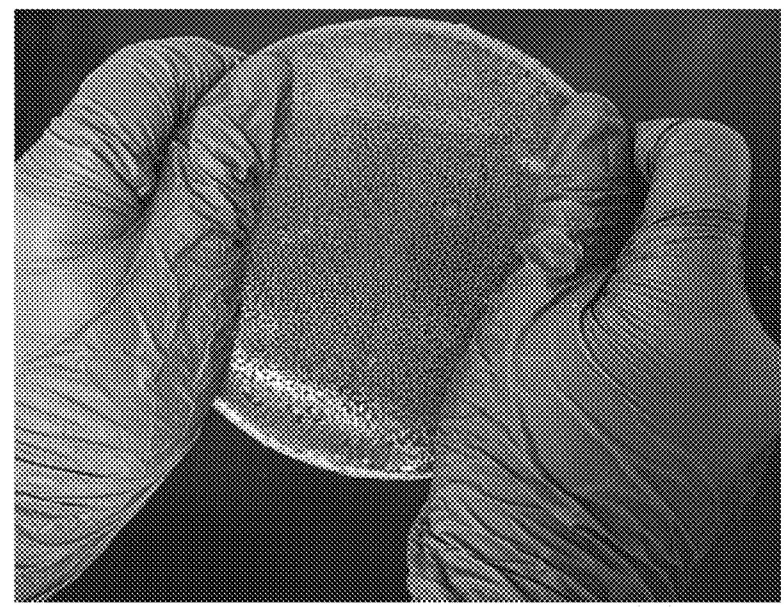
FIG. 1 is a physical photo of the humidity-responsive antibacterial membrane prepared in Example 1.

The present disclosure provides a humidity-responsive antibacterial membrane, including a PDMS membrane and an ultrafine nanogold complex embedded in the PDMS membrane. The ultrafine nanogold complex includes a CD-MOF and ultrafine gold nanoparticles loaded on the CD-MOF.

The humidity-responsive antibacterial membrane according to the present disclosure includes a PDMS membrane and an ultrafine nanogold complex embedded in the PDMS membrane. In some embodiments of the present disclosure, a mass content of the ultrafine nanogold complex in the humidity-responsive antibacterial membrane is not more than 3.65%, preferably 0.1-3.5%, more preferably 0.5-3%, still further more preferably 1-2.5%, and still furthermore preferably 1.5-2.2%, specifically being 0.75%, 1.49%, 2.22%, 2.94%, or 3.65%.

In some embodiments of the present disclosure, the ultrafine gold nanoparticles each have a particle size of 1-3 nm. In some embodiments, a loading rate of the ultrafine gold nanoparticles in the ultrafine nanogold complex is in a range of 0.18-2.33 wt %, specifically being 0.18 wt %, 0.36 wt %, 0.54 wt %, 0.76 wt %, 1.07 wt %, 1.12 wt %, 1.53 wt %, 1.56 wt %, 1.61 wt %, 1.69 wt %, 1.79 wt %, 2.00 wt %, 2.20 wt %, 2.21 wt %, 2.26 wt %, and 2.33 wt %. In the present disclosure, the loading rate refers to a mass ratio of the ultrafine gold nanoparticles to CD-MOF.

In some embodiments of the present disclosure, the humidity-responsive antibacterial membrane has a thickness of 0.45-0.90 mm, preferably 0.55-0.75 mm, and more preferably 0.6 mm.

The present disclosure provides a method for preparing the humidity-responsive antibacterial membrane according to the above technical solution, including the following steps:

- providing raw materials for preparing the PDMS membrane, the raw materials including a silicone elastomer base prepolymer and a silicone elastomer base curing agent;
- mixing the silicone elastomer base prepolymer with the silicone elastomer base curing agent, and conducting forming membrane and precuring, to obtain a precured membrane; and applying the ultrafine nanogold complex onto a surface of the precured membrane, and conducting composite curing treatment, to obtain the humidity-responsive antibacterial membrane.

The present disclosure provides raw materials for preparing the PDMS membrane, the raw materials include a silicone elastomer base prepolymer and a silicone elastomer base curing agent. In examples of the present disclosure, the silicone elastomer base prepolymer (PDMS primary agent) and the silicone elastomer base curing agent (PDMS auxiliary agent) are purchased from Dow Corning with the model of Sylgard 184. In some embodiments of the present disclosure, a volume ratio of the silicone elastomer base prepolymer to the silicone elastomer base curing agent is in a range of 6: (0.5-0.7), and preferably 6:0.6.

According to the present disclosure, the silicone elastomer base prepolymer is mixed with the silicone elastomer base curing agent, and then subjected to forming membrane and precuring, to obtain a precured membrane. In some embodiments of the present disclosure, the forming membrane and precuring includes:

mixing the silicone elastomer base prepolymer and the silicone elastomer base curing agent with a first organic solvent, to obtain a mixed solution; and removing the first organic solvent in the mixed solution to form a prefab membrane, and precuring the prefab membrane to obtain the precured membrane.

According to some embodiments of the present disclosure, the silicone elastomer base prepolymer and the silicone elastomer base curing agent are mixed with a first organic solvent, to obtain a mixed solution. In some embodiments of the present disclosure, the first organic solvent includes n-hexane, methanol, ethanol, or acetonitrile, and preferably is n-hexane. In some embodiments of the present disclosure, a volume ratio of the silicone elastomer base prepolymer to the first organic solvent is in a range of 6: (40-60), and preferably 6:50. In some embodiments of the present disclosure, the mixing is conducted under oscillating conditions. In some embodiments, the oscillating is conducted at a rotation speed of 1000-1500 rpm, and preferably 1300-1500 rpm. In some embodiments, the oscillating is conducted for 20-40 min, and preferably 30 min.

According to some embodiments of the present disclosure, after the mixed solution is obtained, the first organic solvent is removed to form a prefab membrane, and then the prefab membrane is precured to obtain the precured membrane. In some embodiments of the present disclosure, the mixed solution is poured into an evaporating dish, and then the first organic solvent in the mixed solution is removed to obtain the prefab membrane. In some embodiments of the present disclosure, the evaporating dish is a polytetrafluoroethylene evaporating dish. In some embodiments, the evaporating dish has a specification of 100-150 mm, and preferably 120 mm. In some embodiments of the present disclosure, removing the first organic solvent in the mixed solution to form a prefab membrane is conducted under conditions including a temperature of 20-30° C., preferably at room temperature (in examples of the present disclosure, room temperature specifically refers to 25° C.), and a time of 3-6 h, and preferably 4 h. In some embodiments of the present disclosure, an evaporating dish containing the mixed solution is placed in a fume hood, and then the first organic solvent in the mixed solution is removed under the above conditions; a colorless and transparent semi-fluid prefab membrane is obtained on the surface of the evaporating dish.

In some embodiments of the present disclosure, the prefab membrane is precured to obtain the precured membrane. In some embodiments of the present disclosure, the precuring is conducted at a temperature of 70-80° C., and preferably 75-80° C. In some embodiments, the precuring is conducted for 10-20 min, and preferably 15 min. In some embodiments of the present disclosure, the evaporating dish with the prefab membrane thereon is placed in an oven, and precured under the above conditions; a semi-solid colorless and transparent precured membrane is obtained on the surface of the evaporating dish.

According to some embodiments of the present disclosure, after obtaining the precured membrane, the ultrafine nanogold complex is applied onto the surface of the precured membrane and composite curing treatment is conducted, to obtain the humidity-responsive antibacterial membrane. In some embodiments of the present disclosure, the composite curing treatment includes:

dispersing the ultrafine nanogold complex in a second organic solvent to obtain a dispersion liquid; and applying the dispersion liquid onto a surface of the precured membrane, removing the second organic solvent in the dispersion liquid, and then conducting curing, to obtain the humidity-responsive antibacterial membrane.

According to some embodiments of the present disclosure, the ultrafine nanogold complex is dispersed in a second organic solvent to obtain a dispersion liquid. In some embodiments of the present disclosure, the second organic solvent includes n-hexane, methanol, ethanol, or acetonitrile, and preferably is n-hexane. In some embodiments of the present disclosure, a ratio of the ultrafine nanogold complex to the second organic solvent is in a range of (50-250) mg: 25 mL, specifically 50 mg: 25 mL, 100 mg: 25 mL, 150 mg: 25 mL, 200 mg: 25 mL, or 250 mg: 25 mL. In the present disclosure, the preparation method of the ultrafine nanogold complex will be described in detail below.

According to some embodiments of the present disclosure, after obtaining the dispersion liquid, the dispersion liquid is applied onto the surface of the precured membrane, the second organic solvent in the dispersion liquid is removed, and a resulting system is then subjected to curing, to obtain the humidity-responsive antibacterial membrane. According to some embodiments of the present disclosure, the dispersion liquid is poured into an evaporating dish with the precured membrane thereon, the second organic solvent in the dispersion liquid is removed, and a resulting system is then subjected to curing, to obtain the humidity-responsive antibacterial membrane. In some embodiments of the present disclosure, removing the second organic solvent in the dispersion liquid is conducted under conditions including: a temperature of 20-30° C., and preferably room temperature; and a time of 5-15 min, and preferably 10 min. In some embodiments of the present disclosure, the curing is performed at a temperature of 60-80° C., and preferably 70° C. In some embodiments, the curing is performed for 3-5 h, and preferably 4 h. In some embodiments of the present disclosure, the curing is conducted in an oven. In the present disclosure, the silicone elastomer base prepolymer and the silicone elastomer base curing agent are fully cured to from a PDMS membrane. Moreover, during the curing, the ultrafine nanogold complex is embodied into the PDMS membrane. According to some embodiments of the present disclosure, the humidity-responsive antibacterial membrane is scraped off from an evaporating dish with a scraper.

The present disclosure provides use of the humidity-responsive antibacterial membrane according to the above technical solutions or the humidity-responsive antibacterial membrane prepared by the method according to the above technical solution in antibacterial packaging.

The preparation of the ultrafine nanogold complex in the present disclosure will be described in detail below. In some embodiments of the present disclosure, the ultrafine nanogold complex is prepared by a process including the following steps:

mixing CD-MOF, chloroauric acid, and a solvent, and subjecting a resulting mixture to incubation, to obtain the ultrafine nanogold complex.

In some embodiments of the present disclosure, the CD-MOF is made of raw materials including γ-cyclodextrin. In some embodiments of the present disclosure, the CD-MOF is prepared by a process including the following steps:

- mixing γ-cyclodextrin, an alkali metal compound, water, and an organic solvent, and subjecting a resulting mixture to coordination reaction, to obtain a feed liquid of a coordinated product; and
- mixing the feed liquid of the coordinated product with a surfactant, and subjecting a resulting mixture to crystallization, to obtain the CD-MOF.

In some embodiments of the present disclosure, γ-cyclodextrin, an alkali metal compound, water, and an organic solvent are mixed and a resulting mixture is subjected to coordination reaction, to obtain a feed liquid of a coordinated product. In some embodiments of the present disclosure, the alkali metal compound includes a hydroxide of an alkali metal and a chloride of an alkali metal. In some embodiments, the hydroxide of the alkali metal includes potassium hydroxide, rubidium hydroxide, or cesium hydroxide. In some embodiments, the chloride of the alkali metal includes potassium chloride or cesium chloride. In some embodiments of the present disclosure, a molar ratio of the γ-cyclodextrin to an alkali metal in the alkali metal compound is in a range of 1: (5-10), and preferably 1: (9-10). In the present disclosure, alkali metal ions are provided by the alkali metal compound as a metal center for coordination, thus forming a coordination bond. Specifically, potassium hydroxide is taken as an example, in general, potassium ions in the CD-MOF material are 8-coordinated, making 6 γ-cyclodextrins form a minimum building unit of the CD-MOF, which is equivalent to two potassium ions paired with one γ-cyclodextrin molecule, with a chemical formula of $[(C_{48}H_{80}O_{40})(KOH)_2]_n$; in addition, excess potassium hydroxide is conducive to the participation of all γ-cyclodextrin molecules in the reaction. In some embodiments of the present disclosure, the organic solvent includes methanol, ethanol, or acetone. The amount of the organic solvent and water is not particularly limited in the present disclosure, as long as reaction could be conducted smoothly.

In some embodiments of the present disclosure, γ-cyclodextrin, the alkali metal compound, and water are mixed, and ultrasonical dissolution is conducted. The resulting mixture is then filtered with a 0.45 μm aqueous filter membrane. The obtained filtrate is mixed with an organic solvent, and the resulting mixture is subjected to coordination reaction. In some embodiments of the present disclosure, the coordination reaction is conducted at a temperature of 80-100° C., and preferably 90° C. In some embodiments, the coordination reaction is conducted for 3-7 min, and preferably 5 min. In some embodiments, the coordination reaction is conducted at a stirring condition. In some embodiments, the coordination reaction is conducted a stirring rate of 300-500 rpm, and preferably 400 rpm.

In some embodiments of the present disclosure, after the coordination reaction, there is no need of posttreatment, the feed liquid of the coordinated product is mixed with a surfactant, and a resulting mixture is subjected to crystallization to obtain the CD-MOF. In some embodiments of the present disclosure, the surfactant includes polyethylene glycol, cetyl trimethyl ammonium bromide, or triethylamine. In some embodiments, the polyethylene glycol has a molecular weight of 8,000. In some embodiments of the present disclosure, a molar ratio of the surfactant to γ-cyclodextrin is in a range of (0.06-0.07): 1. In some embodiments of the present disclosure, after the feed liquid of the coordinated product is mixed with the surfactant, the resulting mixture is stirred at a temperature of 80-100° C. (preferably 90° C.) for 10-15 min, and left to stand in a cold water bath at a temperature of 20-30° C. (preferably 24° C.) for 10-15 h (preferably 12 h); a white precipitate precipitates out; afterwards, after through solid-liquid separation, the obtained precipitate is washed and dried in sequence, to obtain the CD-MOF. There is no special limitation on means for solid-liquid separation, and means well known to those skilled in the art may be used, such as centrifugal separation. In some embodiments of the present disclosure, a reagent for the washing is methanol. In some embodiments, the washing is performed by centrifugal washing. In some embodiments, the washing is performed 2-3 times. In some embodiments of the present disclosure, the drying is performed by vacuum drying. In some embodiments, the drying is conducted at a temperature of 55-65° C., and preferably 60° C. In some embodiments, the drying is conducted for 4-6 h, and preferably 5 h.

In some embodiments of the present disclosure, after obtaining the CD-MOF, the obtained CD-MOF, chloroauric acid, and a solvent are mixed, and a resulting mixture is incubated to obtain the ultrafine nanogold complex. In some embodiments of the present disclosure, the amount of the CD-MOF is determined based on the γ-cyclodextrin (1 mol CD-MOF contains 6 mol γ-cyclodextrin). In some embodiments, a molar ratio of the γ-cyclodextrin to chloroauric acid is in a range of (2.5-20): 1, preferably (3-15): 1, further preferably (4-10): 1, and still further preferably (5-7.5): 1. In some embodiments of the present disclosure, the solvent is an organic solvent. In some embodiments the organic solvent is acetonitrile or methanol, and preferably acetonitrile. In some embodiments, a ratio of the chloroauric acid to the solvent is in a range of (1.25-1.5) mmol: 1 L, and preferably 1.25 mmol: 1 L.

In some embodiments of the present disclosure, the chloroauric acid is mixed with the solvent, and then the obtained chloroauric acid solution is mixed with the CD-MOF, and a resulting mixture is incubated. In some embodiments of the present disclosure, the incubation is conducted at a temperature of 25-37° C., and preferably 33-37° C. In some embodiments, the incubation is conducted for 3-24 h, preferably 6-23.5 h, further preferably 9-23 h, still further preferably 12-22.5 h, furthermore preferably 15-22 h, and still furthermore preferably 18-21 h. In some embodiments of the present disclosure, the incubation is conducted under an oscillating condition. In some embodiments, the incubation is conducted at an oscillation rate of 10-240 rpm, preferably 30-180 rpm, and further preferably 60-120 rpm. In some embodiments of the present disclosure, the incubation is conducted in the dark. In the present disclosure, trivalent gold ions are reduced to zero valence by plenty of hydroxyl (—OH) present inside the CD-MOF, as a reducing agent, during the incubation.

In some embodiments of the present disclosure, the obtained feed liquid is subjected to solid-liquid separation after the incubation; the obtained solid is washed and dried in sequence to obtain the ultrafine nanogold complex. There are no specific limitations on means for the solid-liquid separation in the present disclosure. In some embodiments, the solid-liquid separation is specifically performed by centrifugal separation. In some embodiments, the centrifugal separation is conducted at a rotation speed of 4000-5000 rpm, and preferably 5000 rpm. In some embodiments, the centrifugal separation is conducted for 5-10 min, and preferably 5-8 min. In some embodiments of the present disclosure, a reagent for the washing is acetonitrile. In some embodiments, the washing is performed by centrifugal washing. In some embodiments, the washing is performed 1-2 times. In some embodiments, operating conditions of the centrifugal washing are consistent with those of the centrifugal separation, which will not be described any more. In some embodiments of the present disclosure, the drying is performed by vacuum drying. In some embodiments, the drying is performed at a temperature of 50-60° C., and preferably 55-60° C. In some embodiments, the drying is performed for 2-3 h, and preferably 2-2.5 h.

The technical solutions of the present disclosure will be clearly and completely described below in conjunction with the examples of the present disclosure. Apparently, the described examples are merely a part rather than all of the examples of the present disclosure. All other examples obtained by those skilled in the art based on the examples of the present disclosure without creative labors shall fall within the scope of the present disclosure.

Preparation Example 1

(1) γ-cyclodextrin (2592 mg, 2 mmol), potassium hydroxide (1024 mg, 18.24 mmol), and ultrapure water (80 mL) were added to a beaker, ultrasonically oscillated at room temperature for 1 min and filtered with a 0.45 μm aqueous filter membrane, obtaining a solution 1.
(2) Methanol (48 mL) was pre-placed in a conical flask, and the solution 1 was added to the conical flask, obtaining a milk-white solution 2. The conical flask was sealed with a sealing film and then placed in a 90° C. water bath kettle, and subjected to reaction at a rotation speed of 400 rpm for 5 min, obtaining a clear and transparent solution 3.
(3) A surfactant polyethylene glycol (PEG-8000, 1024 mg) was rapidly added to the solution 3, obtaining a milk-white solution 4. The milk-white solution 4 got clear and transparent after being stirred for 10 min.
(4) The conical flask was sealed with a sealing film and was left to stand in a 24° C. cold bath for 12 h, and a white precipitate was precipitated. The precipitate was centrifuged in methanol at 5000 rpm for 5 min for subsequent separation. Supernatant was discarded, and the precipitate was dispersed in methanol. The centrifugal separation was operated twice under the same conditions.
(5) The precipitate after centrifugal separation was placed in a vacuum drying oven, dried at 60° C. for 5 h under vacuum conditions, and cooled to room temperature, obtaining the cyclodextrin metal-organic framework (denoted by CD-MOF).
(6) 46.6 mg CD-MOF was placed into 5 mL chloroauric acid-acetonitrile solution having a concentration of 1.5 mM, and the resulting solution was incubated at 37° C. via liquid shake culture at an oscillation speed of 60 rpm in the dark for 21 h.
(7) The feed liquid obtained after incubation was centrifuged at 5000 rpm, and a supernatant formed was discarded. The residue was resuspended with acetonitrile, and centrifugation was conducted once again under the same conditions. A supernatant formed was discarded again, and the precipitate was subjected to vacuum drying at 60° C. for 5 h, obtaining the cyclodextrin metal-organic framework loaded with ultrafine gold nanoparticles (denoted by Au@CD-MOF).

Example 1

6 mL of PDMS primary agent (silicone elastomer base prepolymer, purchased from Dow Corning with the model of Sylgard 184) and 0.6 mL of PDMS auxiliary agent (silicone elastomer base curing agent, purchased from Dow Corning with the model of Sylgard 184) were added to 50 mL n-hexane, and the resulting mixture was oscillated at 1500 rpm for 30 min. The resulting system was then poured into a 120 mm polytetrafluoroethylene (PTFE) evaporating dish, and the evaporating dish was placed in a fume hood and dried at room temperature for 4 h such that n-hexane was volatilized completely. A semi-fluid colorless and transparent PDMS prefab membrane was then obtained on the surface of the PTFE evaporating dish.

The PTFE evaporating dish with the PDMS prefab membrane thereon was placed in an 80° C. oven and the PDMS prefab membrane was precured for 15 min. A semi-fluid colorless and transparent PDMS precured membrane was then obtained on the surface of the PTFE evaporating dish.

150 mg of the Au@CD-MOF prepared in the Preparation Example 1 was added to 25 mL n-hexane, and the resulting mixture was oscillated well, then poured onto the surface of the PDMS precured membrane on the PTFE evaporating dish, and left to stand for 10 min at room temperature such that n-hexane was volatilized completely. Afterwards, the PTFE evaporating dish was placed in a 70° C. oven and cured for 4 h. A humidity-responsive antibacterial membrane (Au@CD-MOF/PDMS, with a thickness of 0.6 mm, mass content of Au@CD-MOF being 2.22%) was obtained on the surface of the PTFE evaporating dish, and then scraped off from the surface of the PTFE evaporating dish with a scraper.

Example 2

Example 2 was performed according to the procedures as described in Example 1, except that the Au@CD-MOF was added in an amount of 50 mg in this example, and the mass content of Au@CD-MOF in the final humidity-responsive antibacterial membrane was 0.75%.

Example 3

Example 3 was performed according to the procedures as described in Example 1, except that the Au@CD-MOF was added in an amount of 100 mg in this example, and the mass content of Au@CD-MOF in the final humidity-responsive antibacterial membrane was 1.49%.

Example 4

Example 4 was performed according to the procedures as described in Example 1, except that the Au@CD-MOF was added in an amount of 200 mg in this example, and the mass content of Au@CD-MOF in the final humidity-responsive antibacterial membrane was 2.94%.

Example 5

Example 5 was performed according to the procedures as described in Example 1, expect that the Au@CD-MOF was added in an amount of 250 mg in this example, and the mass content of Au@CD-MOF in the final humidity-responsive antibacterial membrane was 3.65%.

Comparative Example 1

Comparative Example 1 was performed according to the procedures as described in Example 1, expect that no Au@CD-MOF was added in this example, and a pure PDMS membrane was obtained finally.

Characterization and Performance Test

FIG. 1 is a physical photo of the humidity-responsive antibacterial membrane prepared in Example 1. The membrane has good toughness and its surface is dark red, which is caused by the deposition of the ultrafine gold nanoparticle in Au@CD-MOF.

Figure 2:
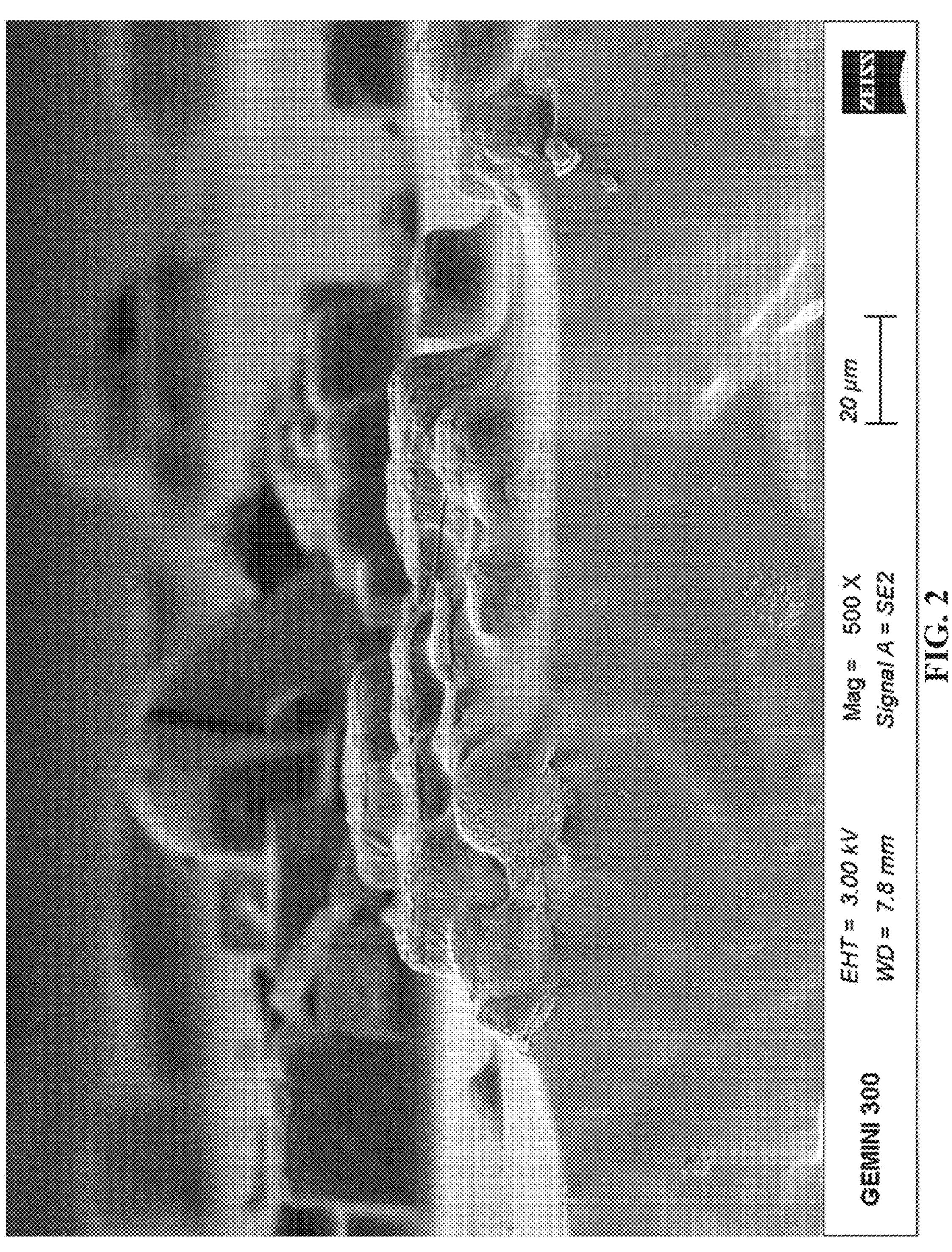
FIG. 2 shows a scanning electron microscope (SEM) image of a cross section of the humidity-responsive antibacterial membrane prepared in Example 1.

FIG. 2 shows an SEM image of a cross section of the humidity-responsive antibacterial membrane prepared in Example 1. The result shows that the square Au@CD-MOF is semi-embedded in the surface of the PDMS membrane to form the humidity-responsive antibacterial membrane.

Figure 3:
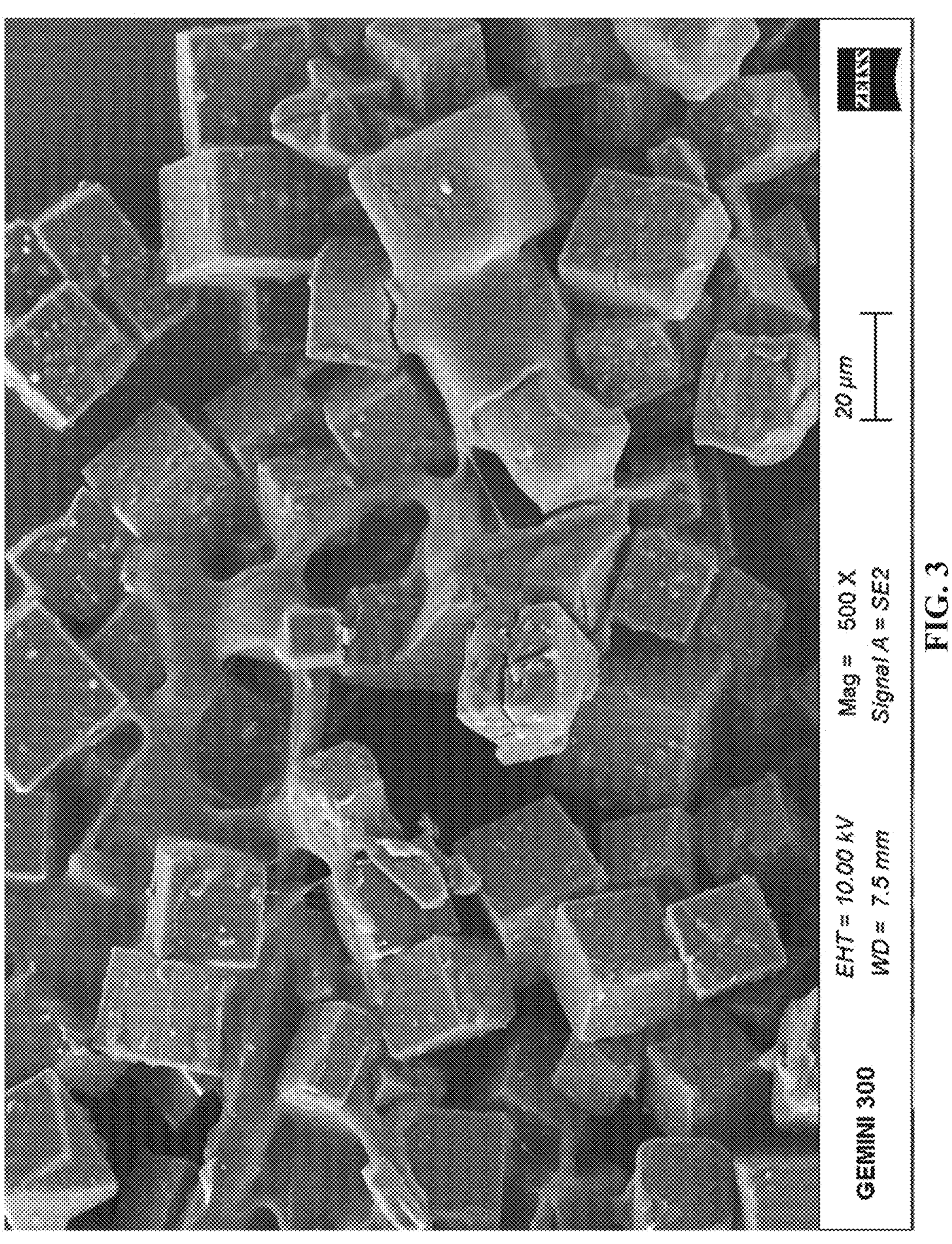
FIG. 3 shows an SEM image of a surface of the humidity-responsive antibacterial membrane prepared in Example 1.

FIG. 3 shows an SEM image of a surface of the humidity-responsive antibacterial membrane prepared in Example 1. The result shows that Au@CD-MOF still maintains a standard square shape after being embedded in the surface of the PDMS membrane.

Figure 4:
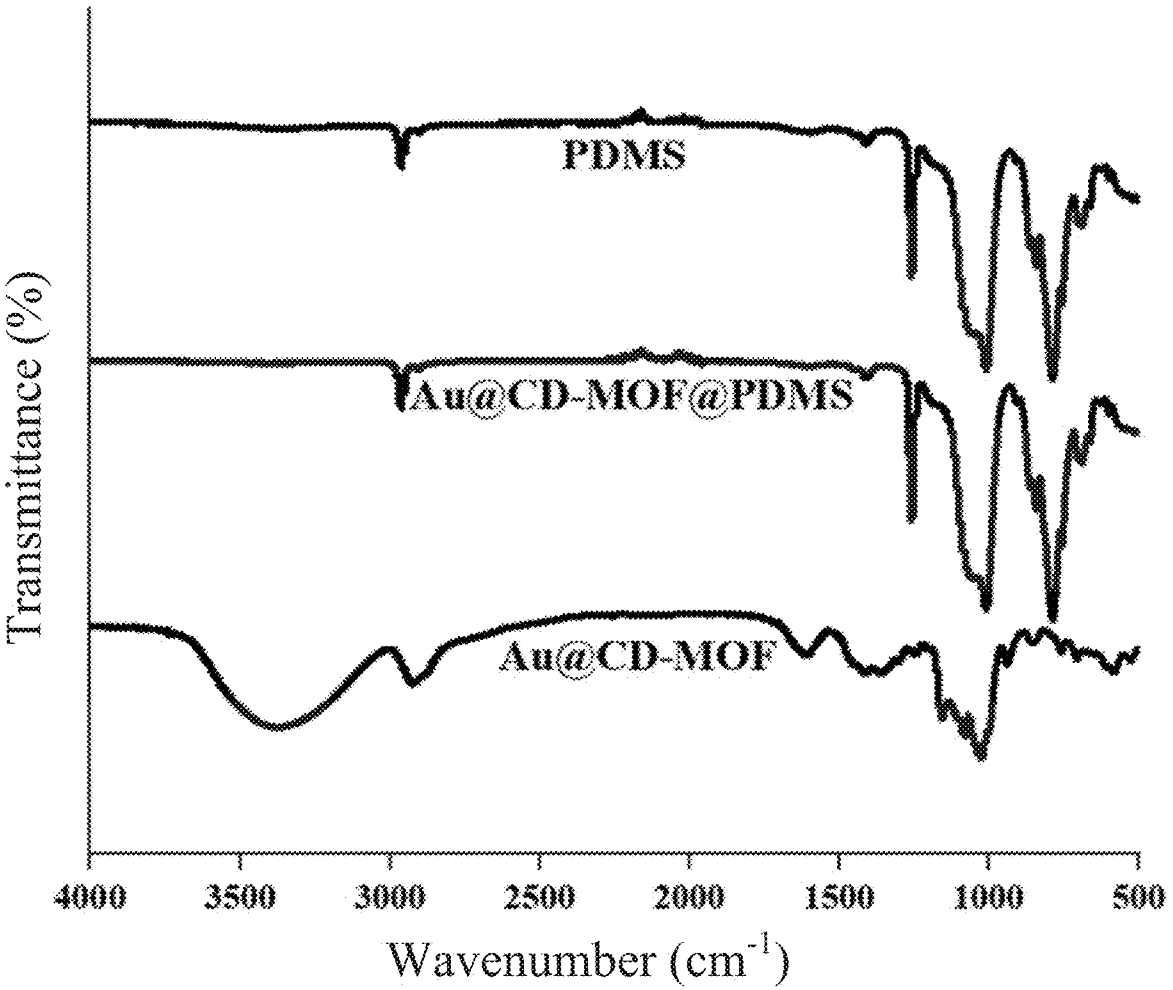
FIG. 4 shows infrared spectrograms of Au@CD-MOF, a pure PDMS membrane prepared in Comparative Example 1, and the humidity-responsive antibacterial membrane prepared in Example 1.

FIG. 4 shows infrared spectrograms of Au@CD-MOF, a pure PDMS membrane prepared in Comparative Example 1, and the humidity-responsive antibacterial membrane prepared in Example 1. The results show that compared with the PDMS, the humidity-responsive antibacterial membrane has no new characteristic peak, indicating that there is no chemical action between PDMS and Au@CD-MOF.

Figure 5:
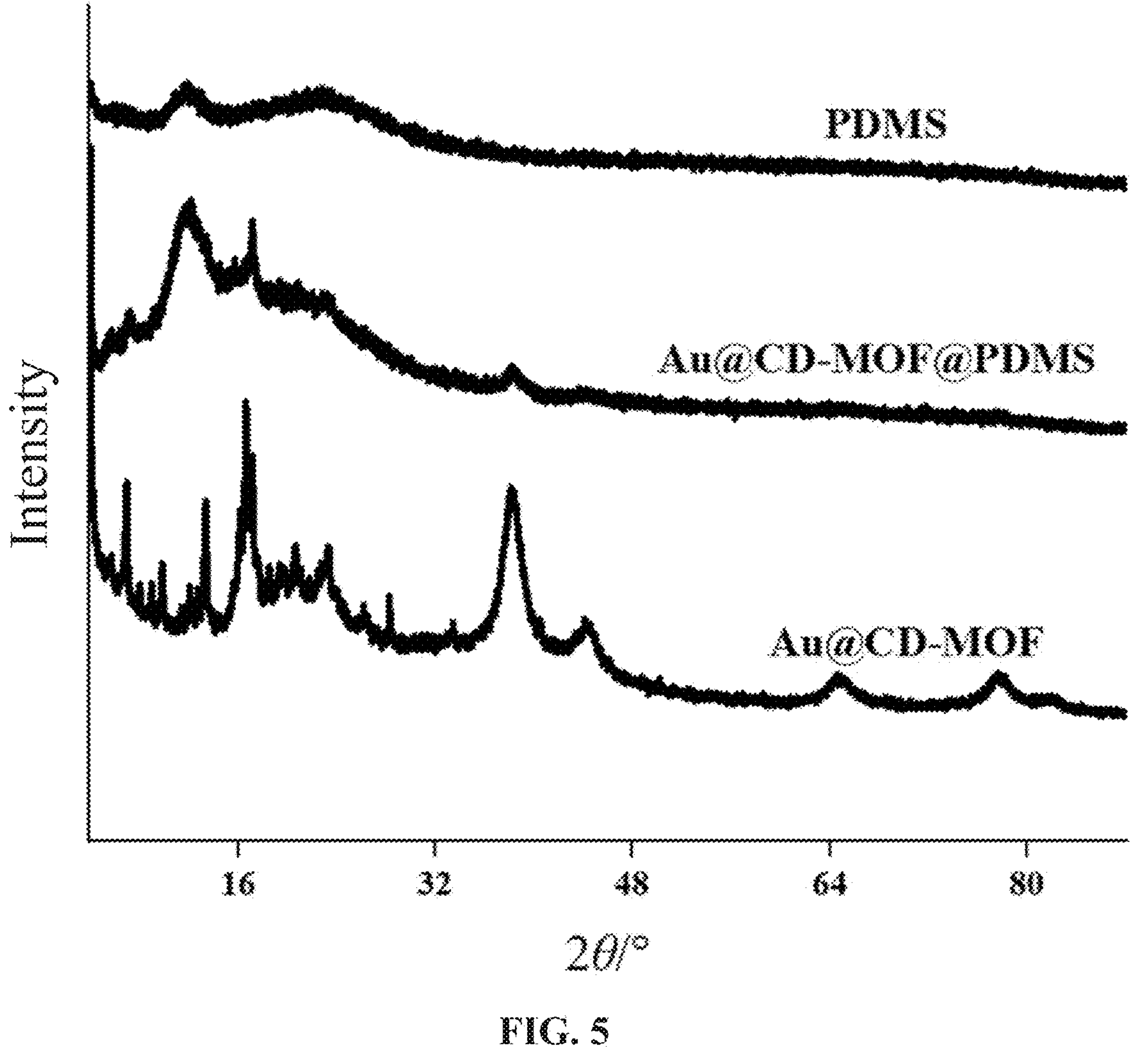
FIG. 5 shows X-ray powder diffraction (XRD) patterns of Au@CD-MOF, the pure PDMS membrane prepared in Comparative Example 1, and the humidity-responsive antibacterial membrane prepared in Example 1.

FIG. 5 shows XRD patterns of Au@CD-MOF, a pure PDMS membrane prepared in Comparative Example 1, and the humidity-responsive antibacterial membrane prepared in Example 1. The results show that positions of peaks in the XRD pattern of the humidity-responsive antibacterial membrane are consistent with those of the Au@CD-MOF. Moreover, compared with the amorphous pattern of the PDMS, the humidity-responsive antibacterial membrane has certain crystal characteristic peaks, indicating that Au@CD-MOF is successfully doped into the humidity-responsive antibacterial membrane.

Figure 6:
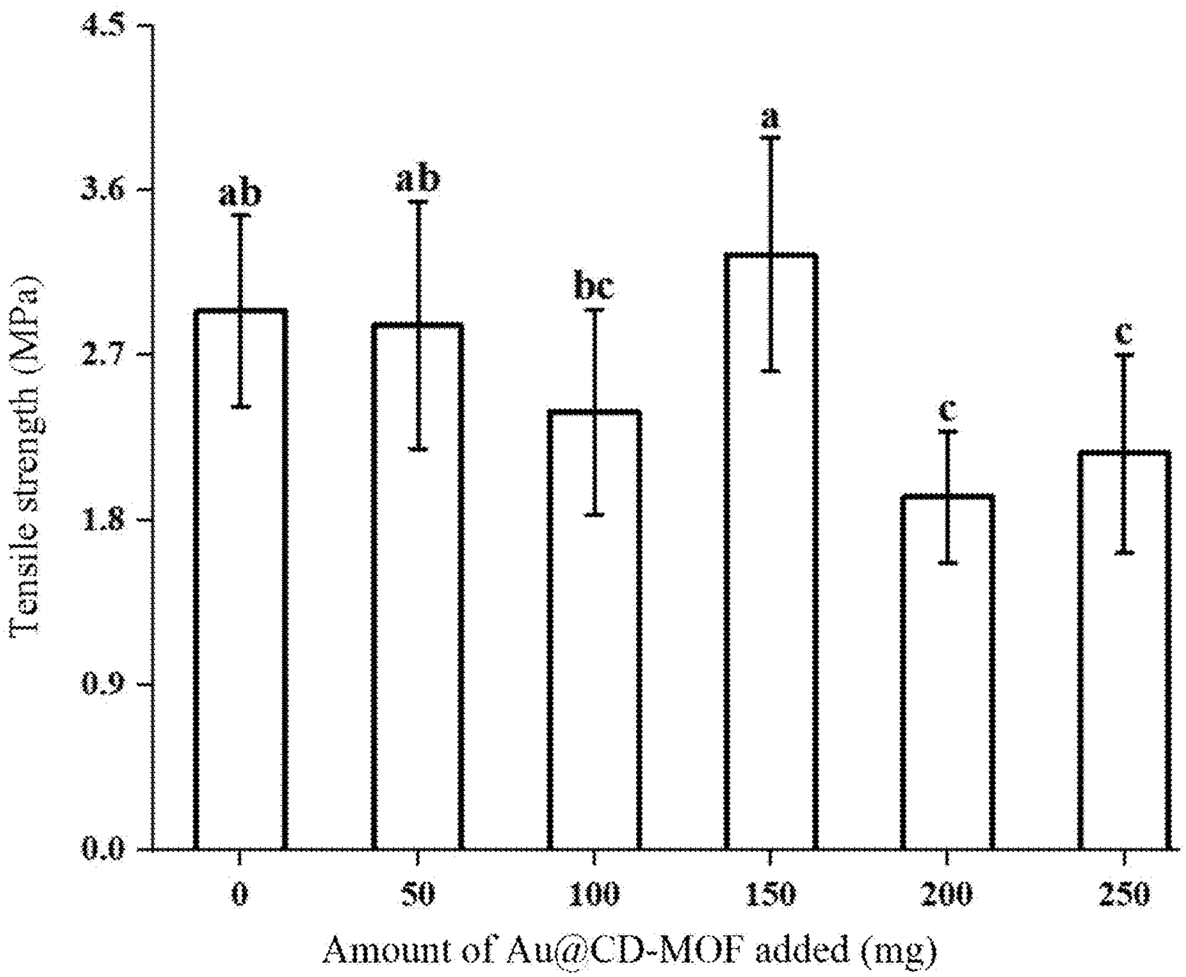
FIG. 6 shows test results of tensile strength of the pure PDMS membrane prepared in Comparative Example 1, and the humidity-responsive antibacterial membranes prepared in Examples 1-5.
Figure 7:
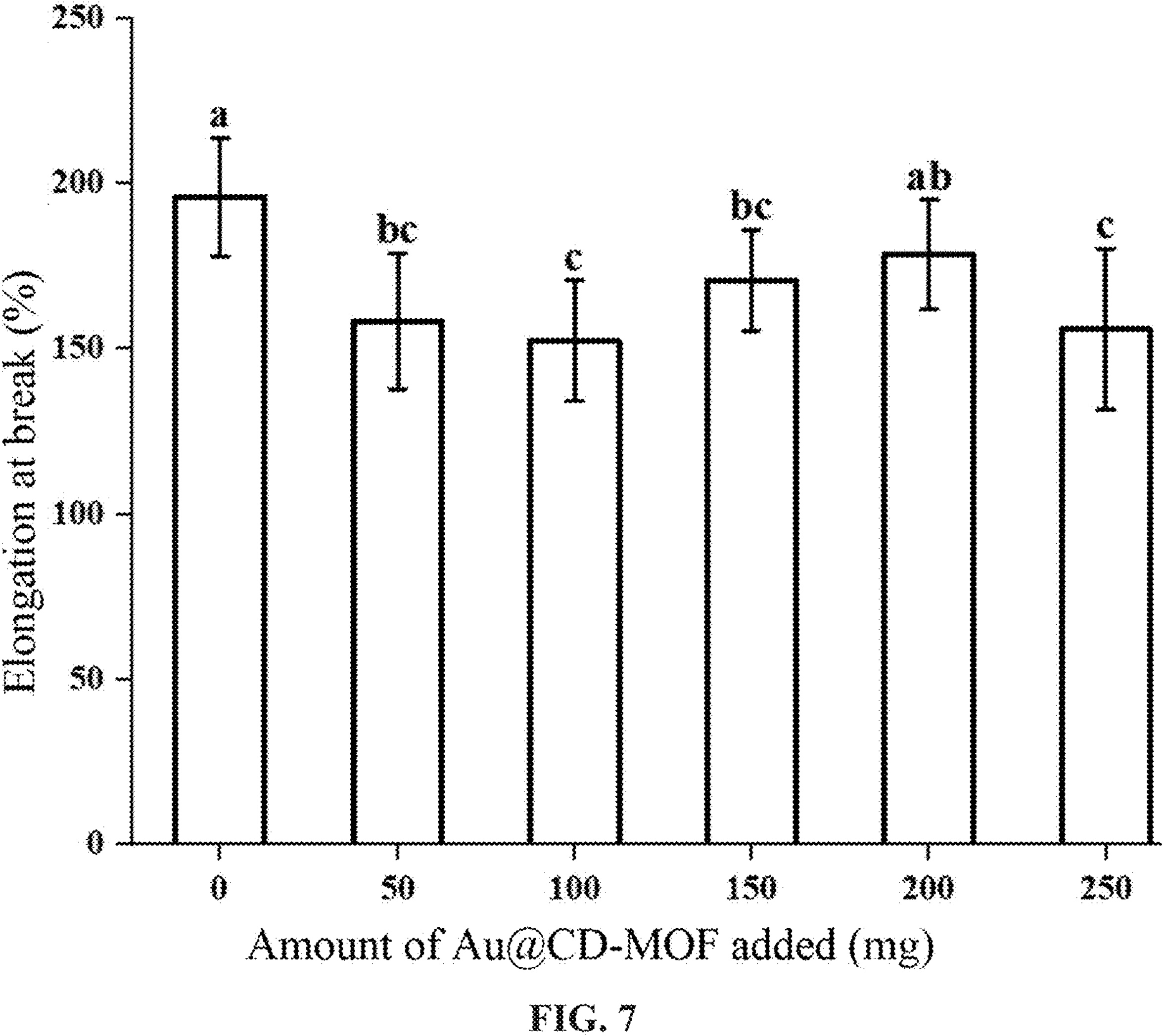
FIG. 7 shows test results of elongation at break of the pure PDMS membrane prepared in Comparative Example 1, and the humidity-responsive antibacterial membranes prepared in Examples 1-5.
Figure 8:
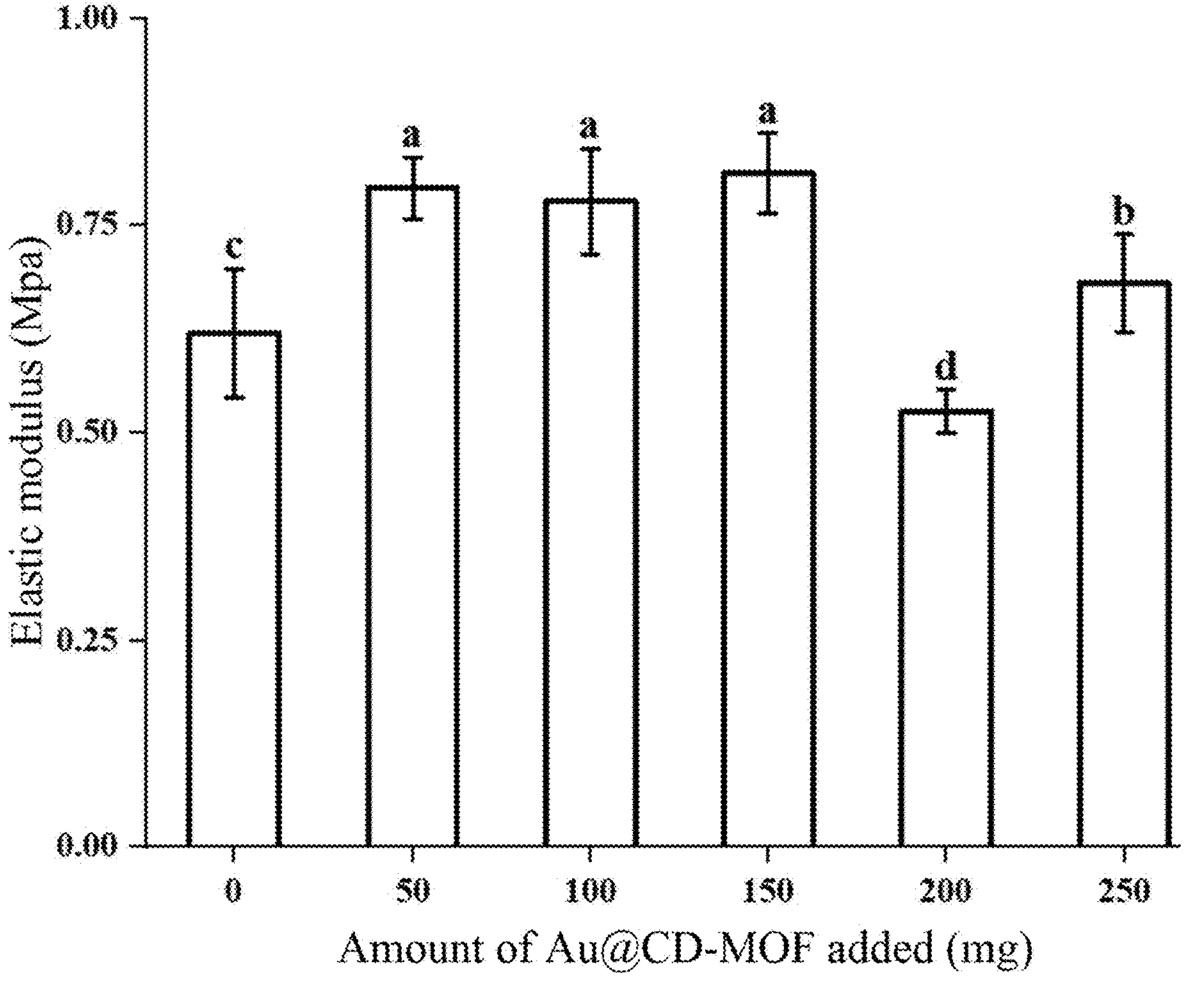
FIG. 8 shows test results of elastic modulus of the pure PDMS membrane prepared in Comparative Example 1, and the humidity-responsive antibacterial membranes prepared in Examples 1-5.

FIG. 6 shows test results of tensile strength of the pure PDMS membrane prepared in Comparative Example 1, and the humidity-responsive antibacterial membranes prepared in Examples 1-5. FIG. 7 shows test results of elongation at break of the pure PDMS membrane prepared in Comparative Example 1, and the humidity-responsive antibacterial membranes prepared in Examples 1-5. FIG. 8 shows test results of elastic modulus of the pure PDMS membrane prepared in Comparative Example 1, and the humidity-responsive antibacterial membranes prepared in Examples 1-5. The results show that the humidity-responsive antibacterial membranes have different mechanical properties at different amount of Au@CD-MOF added. Moreover, when the amount of Au@CD-MOF added is 150 mg (the tensile strength is 3.25 MPa), the humidity-responsive antibacterial membrane has the optimal mechanical property; compared with the pure PDMS membrane (tensile strength is 2.94 MPa), there is an increase of 10% in tensile strength, as well as an increase of 30% in elastic modulus.

Figure 9:
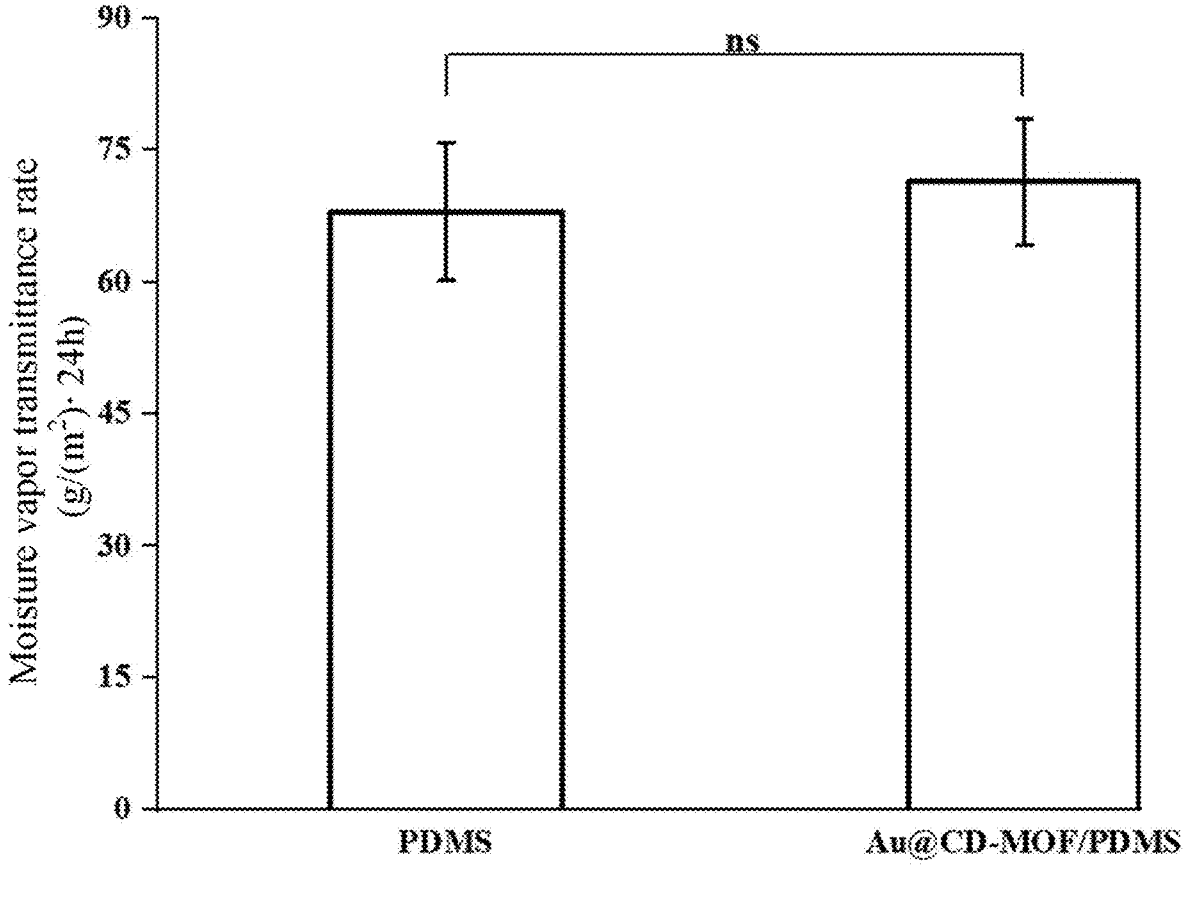
FIG. 9 shows test results of moisture vapor transmittance rate of the pure PDMS membrane prepared in Comparative Example 1, and the humidity-responsive antibacterial membrane prepared in Example 1.

FIG. 9 shows test results of moisture vapor transmittance rate of the pure PDMS membrane prepared in Comparative Example 1, and the humidity-responsive antibacterial membrane prepared in Example 1. The results show that the addition of Au@CD-MOF does not affect the ability of the humidity-responsive antibacterial membrane to block water vapor.

Figure 10:
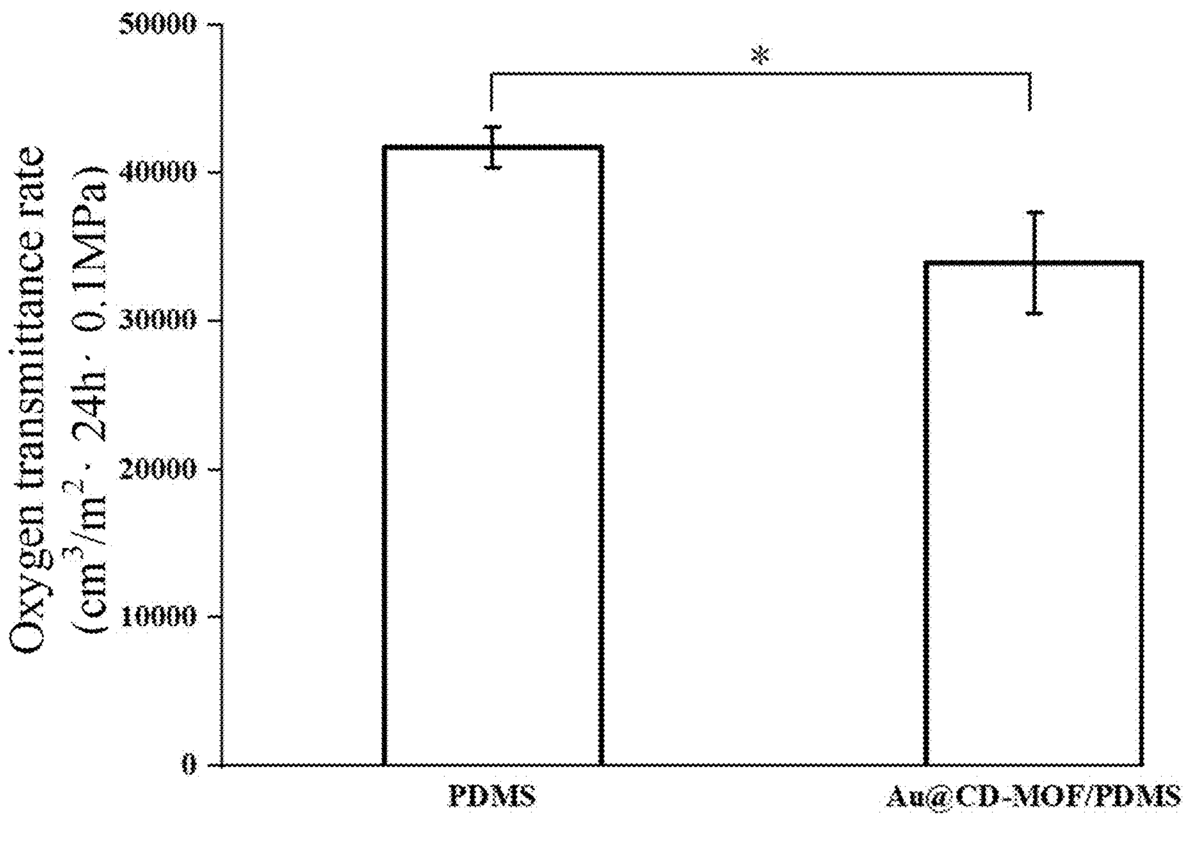
FIG. 10 shows test results of oxygen transmittance rate of the pure PDMS membrane prepared in Comparative Example 1, and the humidity-responsive antibacterial membrane prepared in Example 1.

FIG. 10 shows test results of oxygen transmittance rate of the pure PDMS membrane prepared in Comparative Example 1, and the humidity-responsive antibacterial membrane prepared in Example 1. The results show that the addition of Au@CD-MOF enhances the ability of the humidity-responsive antibacterial membrane to block oxygen.

Figure 11:
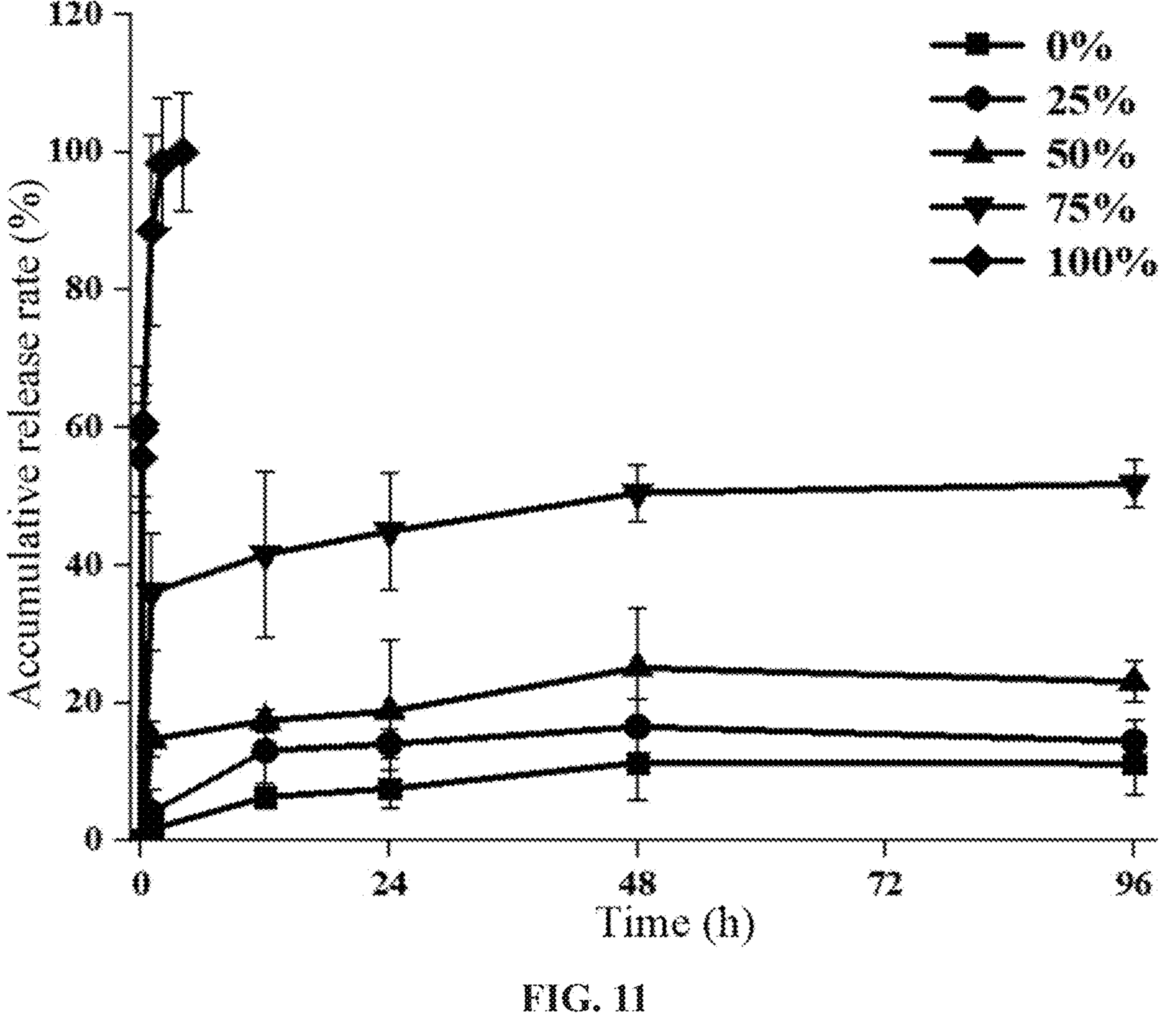
FIG. 11 is a diagram showing an accumulative release rate of ultrafine gold nanoparticles from the humidity-responsive antibacterial membrane prepared in Example 1 at different humidity.

FIG. 11 is a diagram showing accumulative release rates of ultrafine gold nanoparticles from the humidity-responsive antibacterial membrane prepared in Example 1 at different humidity. The results show that when the relative humidity is 100%, 55% accumulative release rate of ultrafine gold nanoparticles is realized from the humidity-responsive antibacterial membrane within 1 min, indicating that the Au@CD-MOF disintegrates rapidly at a high humidity, thus causing the rapid release of the loaded substance, i.e., the ultrafine gold nanoparticles. Moreover, the accumulative release rate of the ultrafine gold nanoparticles reaches 100% within 4 h. However, when the relative humidity decreases to 75%, the accumulative release rate of the ultrafine gold nanoparticles from the humidity-responsive antibacterial membrane is only 51% 96 h later. When the relative humidity continuously reduces to 50%, 25%, and 0%, the accumulative release rates of the ultrafine gold nanoparticles from the humidity-responsive antibacterial membrane are 23%, 14%, and 11%, respectively 96 h later. Therefore, Au@CD-MOF disintegrates rapidly to release the ultrafine gold nanoparticles at a high humidity, but slowly disintegrates to release less ultrafine gold nanoparticles at a low humidity. It indicates that the humidity-responsive antibacterial membrane has good response ability to humidity.

Figure 12:
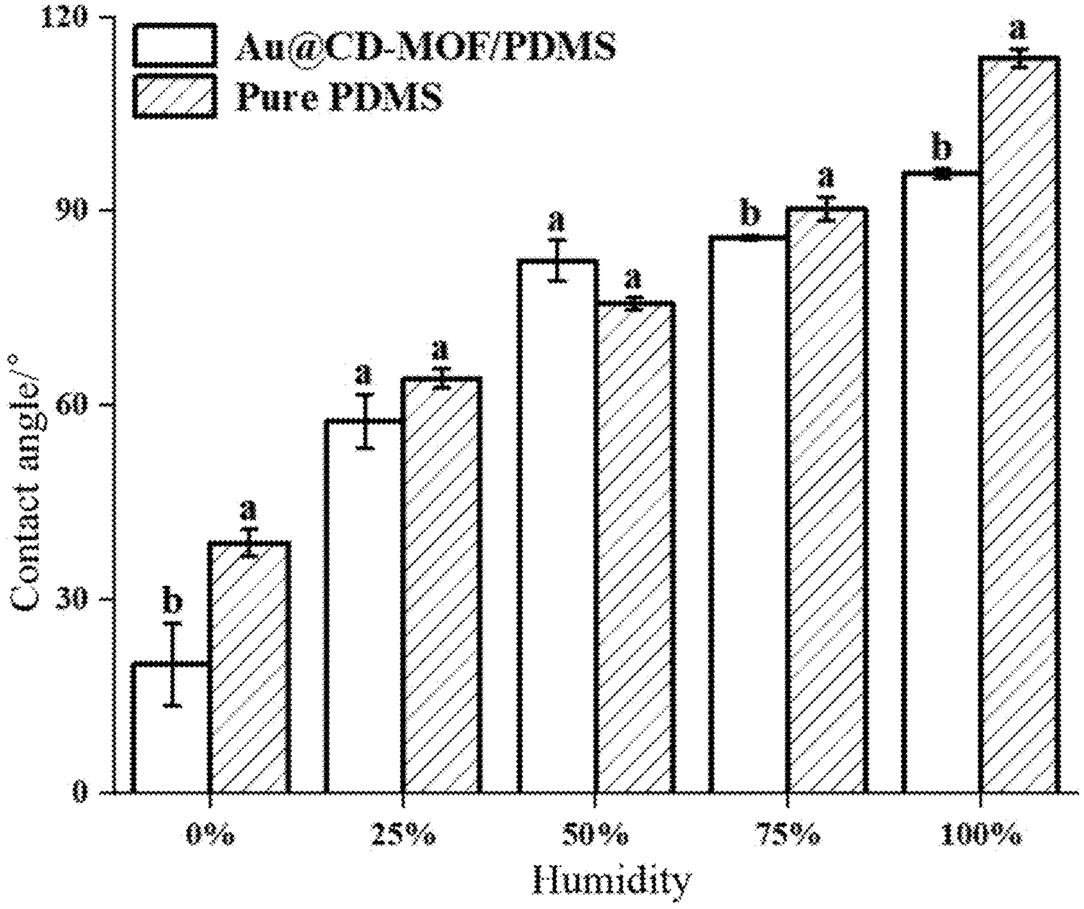
FIG. 12 shows contact angles of the pure PDMS membrane prepared in Comparative Example 1, and the humidity-responsive antibacterial membrane prepared in Example 1 in relative to different humidity simulation solutions.

FIG. 12 shows contact angles of the pure PDMS membrane prepared in Comparative Example 1, and the humidity-responsive antibacterial membrane prepared in Example 1 in relative to different humidity simulation solutions. The results show that the contact angle of the humidity-responsive antibacterial membrane is substantially smaller than that of the pure PDMS membrane, indicating that the addition of the hydrophilic Au@CD-MOF changes the contact angle of the humidity-responsive antibacterial membrane to achieve better hydrophilicity compared with the pure PDMS membrane.

Figure 13:
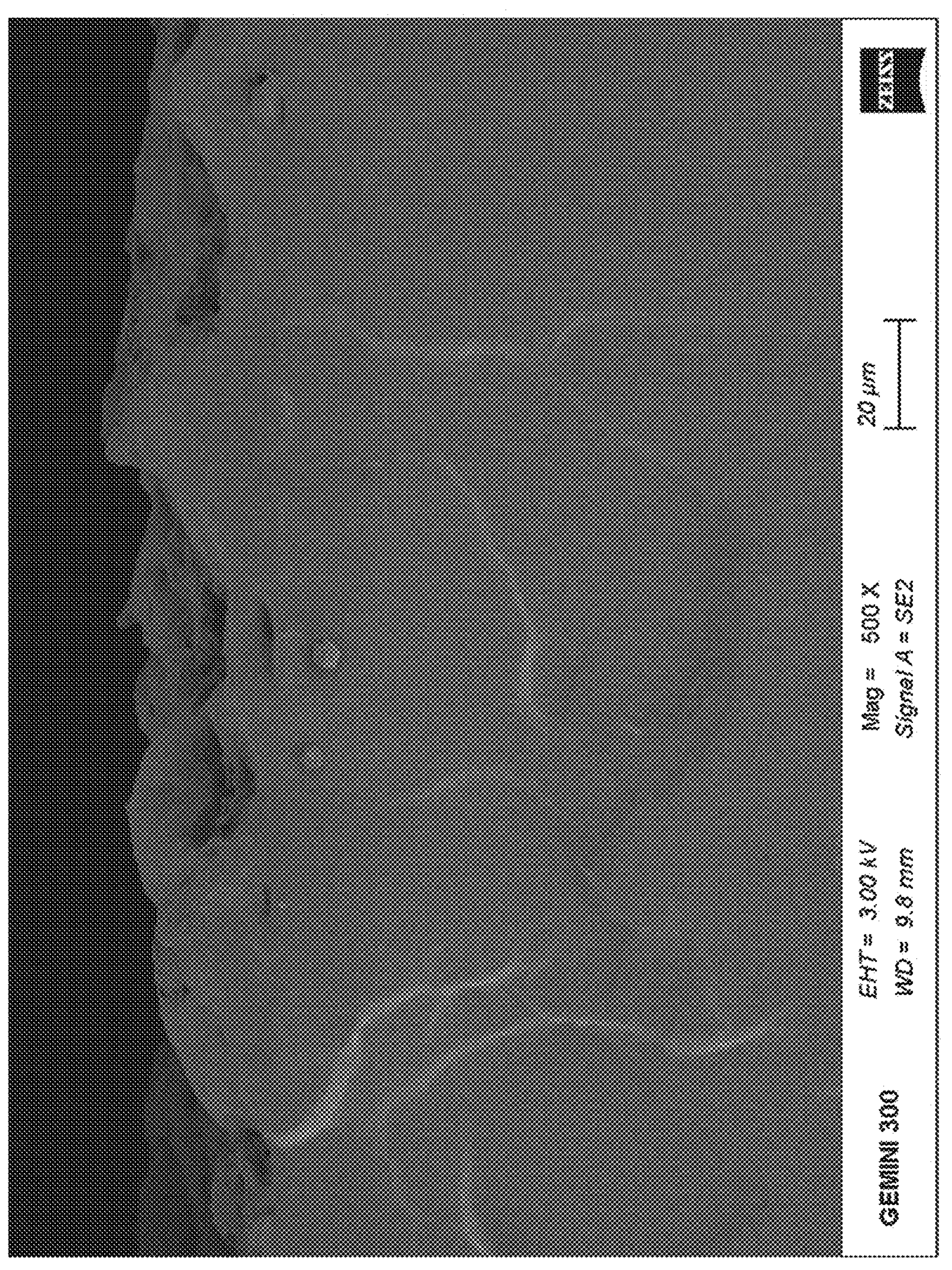
FIG. 13 shows an SEM image of a cross section of the humidity-responsive antibacterial membrane prepared in Example 1 after being soaked for 5 min at a relative humidity of 100%.
Figure 14:
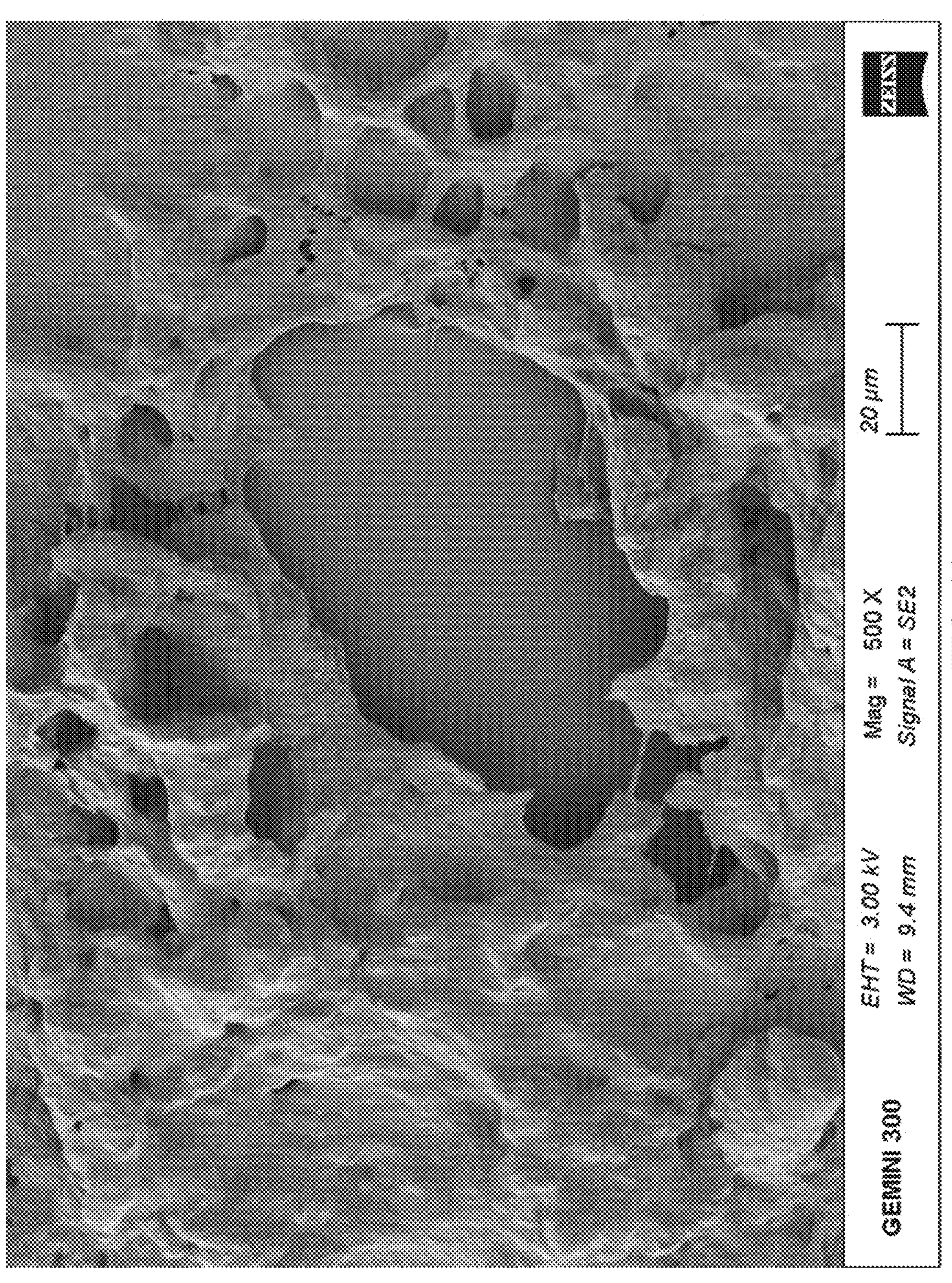
FIG. 14 shows an SEM image of a surface of the humidity-responsive antibacterial membrane prepared in Example 1 after being soaked for 5 min at a relative humidity of 100%.

FIG. 13 shows an SEM image of a cross section of the humidity-responsive antibacterial membrane prepared in Example 1 after being soaked for 5 min at a relative humidity of 100%. FIG. 14 shows an SEM image of a surface of the humidity-responsive antibacterial membrane prepared in Example 1 after being soaked for 5 min at a relative humidity of 100%. Pores and holes can be observed clearly, which are formed after the soaked Au@CD-MOF falls out of the humidity-responsive antibacterial membrane and disintegrates, indicating that the humidity-responsive antibacterial membrane has good response ability to humidity.

Figure 15:
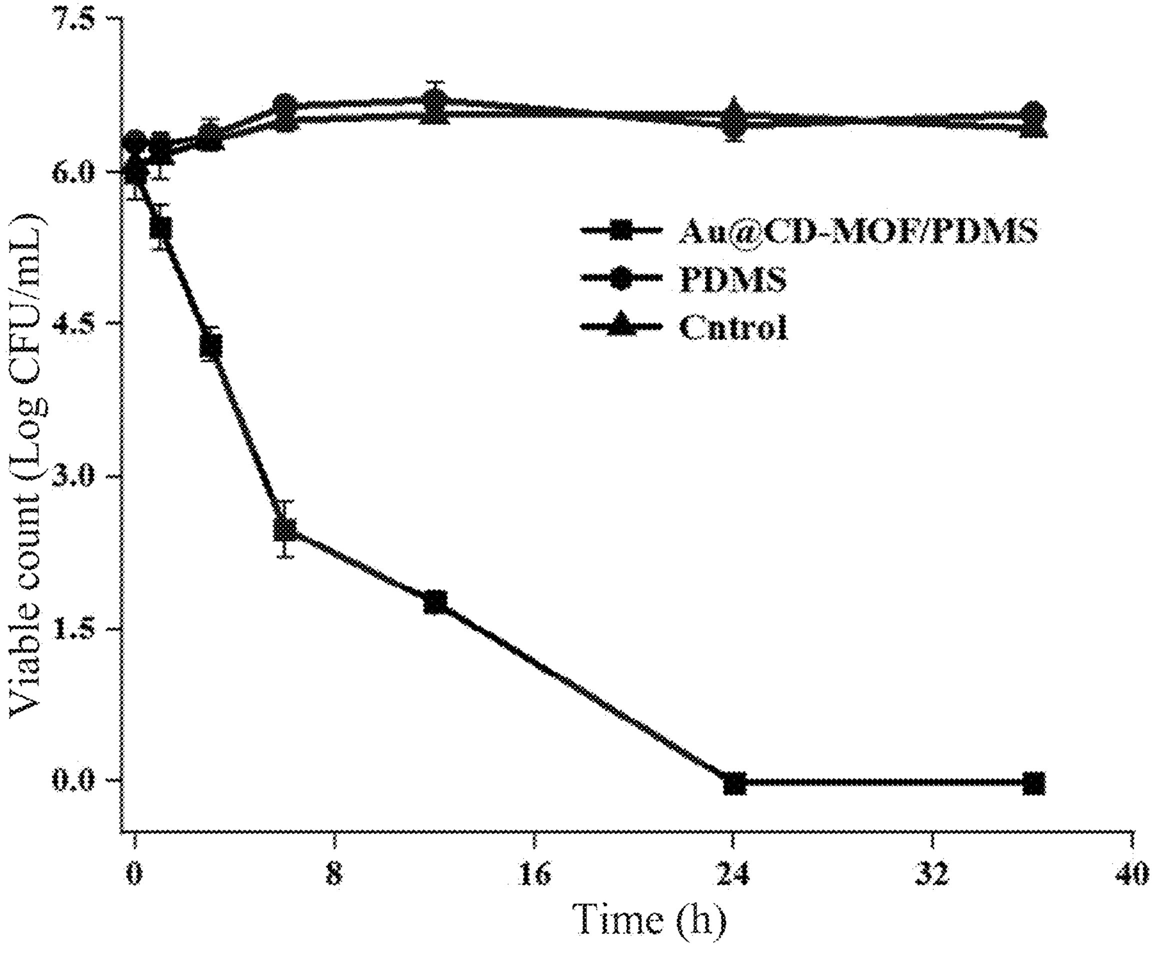
FIG. 15 shows bactericidal lethal curves of the pure PDMS membrane prepared in Comparative Example 1, and the humidity-responsive antibacterial membrane prepared in Example 1 against *Escherichia coli O*157:H7 at a relative humidity of 100%.

FIG. 15 shows bactericidal lethal curves of the pure PDMS membrane prepared in Comparative Example 1, and the humidity-responsive antibacterial membrane prepared in Example 1 against *Escherichia coli* O157:H7 at a relative humidity of 100%. The results show that the humidity-responsive antibacterial membrane achieves a 6.0-log lethal effect against *Escherichia coli* O157:H7 within 24 h.

Figure 16:
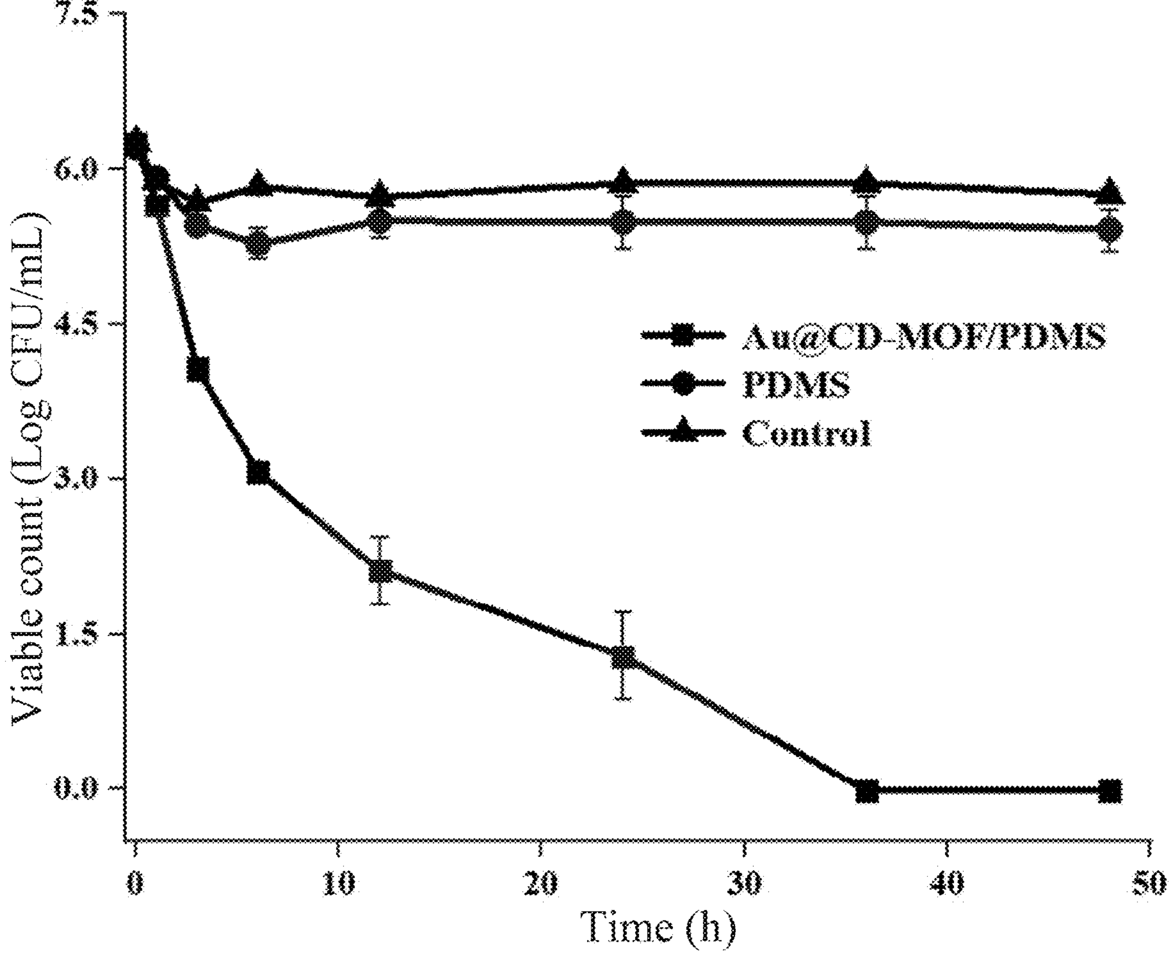
FIG. 16 shows bactericidal lethal curves of the pure PDMS membrane prepared in Comparative Example 1, and the humidity-responsive antibacterial membrane prepared in Example 1 against *Staphylococcus aureus* at a relative humidity of 100%.

FIG. 16 shows bactericidal lethal curves of the pure PDMS membrane prepared in Comparative Example 1, and the humidity-responsive antibacterial membrane prepared in Example 1 against *Staphylococcus aureus* at a relative humidity of 100%. The results show that the humidity-responsive antibacterial membrane achieves a 6.3-log lethal effect against *Staphylococcus aureus* within 36 h.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A humidity-responsive antibacterial membrane, comprising a polydimethylsiloxane (PDMS) membrane, and an ultrafine nanogold complex embedded in the PDMS membrane, wherein the ultrafine nanogold complex comprises a cyclodextrin metal-organic framework (CD-MOF) and ultrafine gold nanoparticles loaded on the CD-MOF.

2. The humidity-responsive antibacterial membrane as claimed in claim 1, wherein the humidity-responsive antibacterial membrane has a thickness of 0.45-0.90 mm.

3. The humidity-responsive antibacterial membrane as claimed in claim 1, wherein a mass content of the ultrafine nanogold complex in the humidity-responsive antibacterial membrane is not more than 3.65%.

4. The humidity-responsive antibacterial membrane as claimed in claim 2, wherein a mass content of the ultrafine nanogold complex in the humidity-responsive antibacterial membrane is not more than 3.65%.

5. The humidity-responsive antibacterial membrane as claimed in claim 1, wherein the ultrafine gold nanoparticles each have a particle size of 1-3 nm, and a loading rate of the ultrafine gold nanoparticles in the ultrafine nanogold complex is in a range of 0.18-2.33 wt %.

6. A method for preparing the humidity-responsive antibacterial membrane as claimed in claim 1, comprising the steps of providing raw materials for preparing the polydimethylsiloxane (PDMS) membrane, the raw materials comprising a silicone elastomer base prepolymer and a silicone elastomer base curing agent;

mixing the silicone elastomer base prepolymer with the silicone elastomer base curing agent, and conducting forming membrane and precuring, to obtain a precured membrane; and applying the ultrafine nanogold complex onto a surface of the precured membrane, and conducting composite curing treatment, to obtain the humidity-responsive antibacterial membrane.

7. The method as claimed in claim 6, wherein the forming membrane and precuring comprises:

mixing the silicone elastomer base prepolymer and the silicone elastomer base curing agent with a first organic solvent, to obtain a mixed solution; and removing the first organic solvent in the mixed solution to form a prefab membrane, and precuring the prefab membrane, to obtain the precured membrane.

8. The method as claimed in claim 7, wherein removing the first organic solvent in the mixed solution to form a prefab membrane is conducted under conditions comprising a temperature of 20-30° C., and a time of 3-6 h; and the precuring is conducted at a temperature of 70-80° C. for 10-20 min.

9. The method as claimed in claim 6, wherein the composite curing treatment comprises dispersing the ultrafine nanogold complex in a second organic solvent to obtain a dispersion liquid; and applying the dispersion liquid onto a surface of the precured membrane, removing the second organic solvent in the dispersion liquid, and conducting curing, to obtain the humidity-responsive antibacterial membrane.

10. The method as claimed in claim 9, wherein the curing is conducted at a temperature of 65-85° C. for 3-5 h.

11. The method as claimed in claim 6, wherein the humidity-responsive antibacterial membrane has a thickness of 0.45-0.90 mm.

12. The method as claimed in claim 6, wherein a mass content of the ultrafine nanogold complex in the humidity-responsive antibacterial membrane is not more than 3.65%.

13. The method as claimed in claim 6, wherein the ultrafine gold nanoparticles each have a particle size of 1-3 nm, and a loading rate of the ultrafine gold nanoparticles in the ultrafine nanogold complex is in a range of 0.18-2.33 wt %.

14. The humidity-responsive antibacterial membrane as claimed in claim 1, wherein the humidity-responsive antibacterial membrane is used in antibacterial packaging.

15. A humidity-responsive antibacterial membrane prepared by the method as claimed in claim 6, wherein the humidity-responsive antibacterial membrane is used in antibacterial packaging.

* * * * *